May 26, 1936.  O. B. MOYE  2,042,236
INSECT TRAP
Filed July 3, 1935    2 Sheets-Sheet 1
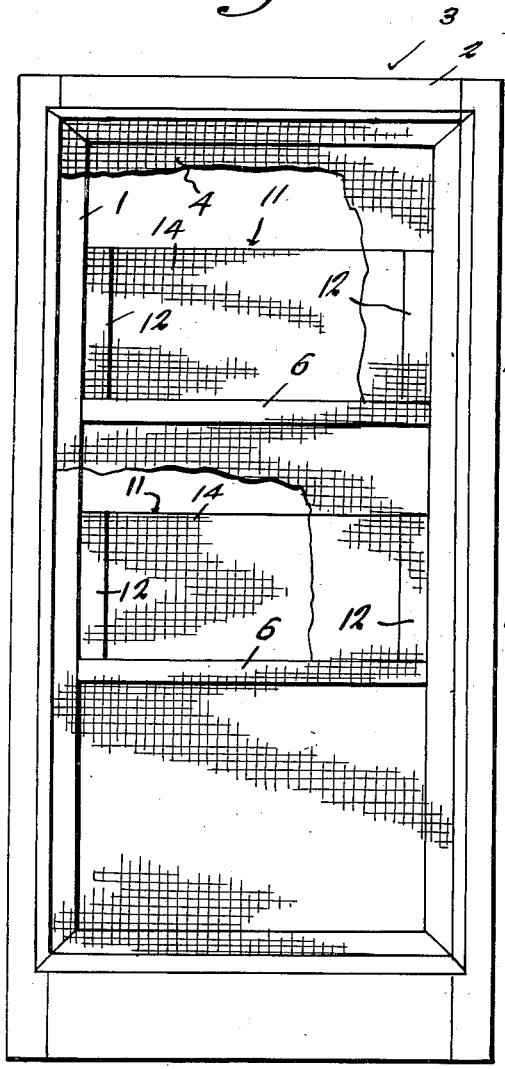
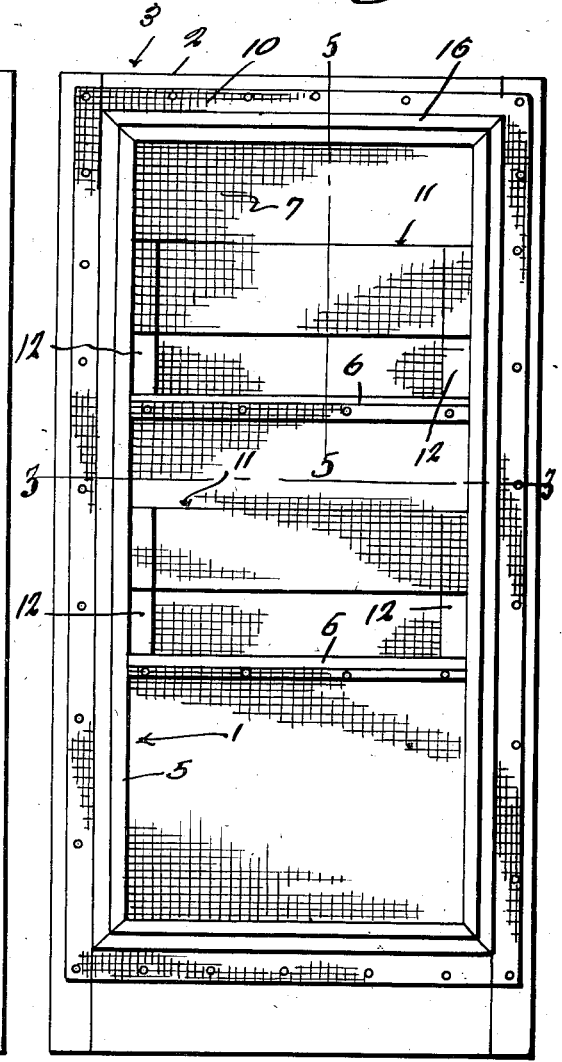
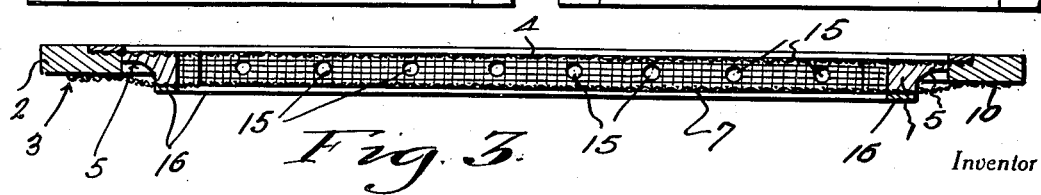
Inventor
O. B. Moye
By Clarence A. O'Brien
Attorney

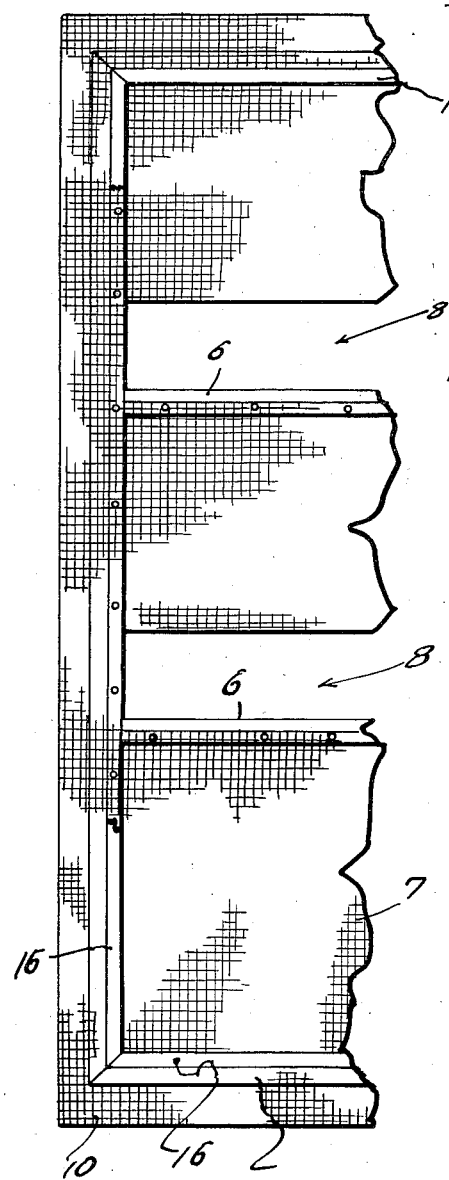
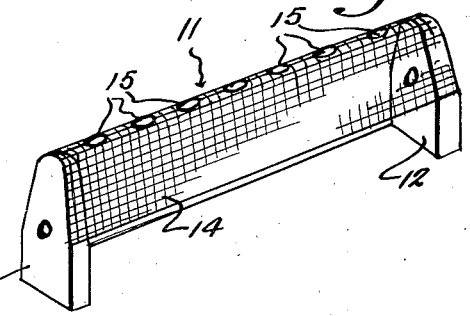
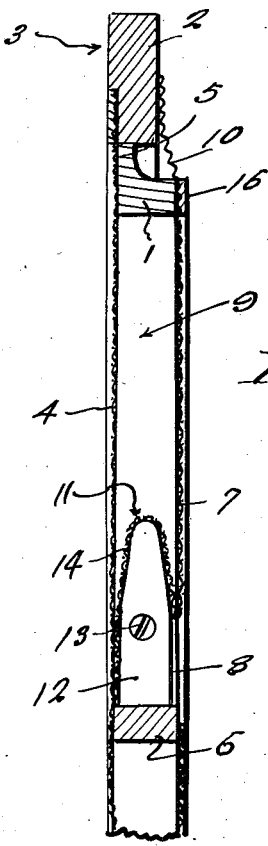

Patented May 26, 1936

2,042,236

UNITED STATES PATENT OFFICE 2,042,236

INSECT TRAP

Otis B. Moye, Soperton, Ga.

Application July 3, 1935, Serial No. 29,718

2 Claims. (Cl. 43—119)

The present invention relates to new and useful improvements in insect traps for use particularly in connection with window and door screens, etc., and has for one of its important objects to provide, in a manner as hereinafter set forth, a trap of this character which may be expeditiously installed with a minimum of labor.

Another important object of the invention is to provide an insect trap of the character described which may be successfully installed in various sizes of openings within a given range.

Still another very important object of the invention is to provide a trap of the aforementioned character embodying a construction and arrangement which is such that said trap may be conveniently cleaned when desired.

Other objects of the invention are to provide an insect trap which will be comparatively simple in construction, strong, durable, highly efficient and reliable in use, compact, and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is an elevational view, looking at one side of a screen door in which an embodiment of the invention has been installed, portions of the door screen being broken away.

Figure 2 is an elevational view looking at the opposite side of the screen door with the invention installed therein Figure 3 is a horizontal sectional view, taken substantially on the line 3—3 of Figure 2.

Figure 4 is an elevational view of a portion of the trap, showing the same removed from the door.

Figure 5 is a vertical sectional view, taken substantially on the line 5—5 of Figure 2.

Figure 6 is a detail view in perspective of one of the removable throats.

Referring now to the drawings in detail, it will be seen that the embodiment of the invention which has been illustrated comprises a frame 1 of suitable material, preferably wood, which is mounted in, and spaced inwardly from, the frame 2 of a door which is designated generally by the reference numeral 3. It will be observed that, when installed, the frame 1 abuts or engages the screen 4 of the door 3, as illustrated to advantage in Figure 5 of the drawings. On its outer edge the frame 1 is provided with a flange 5 which may be cut off as may be necessary to fit said frame 1 properly in various sizes of door or window screen frames.

Mounted in the frame 1, at vertically spaced points, are cross bars 6. Mounted on the side of the frame 1 which is remote from the door screen 4 is a screen 7 having cut-outs therein immediately above the cross bars 6 providing entrance openings 8. From a consideration of the invention as so far described, it will be seen that a plurality of chambers or compartments 9 in which the insects are trapped have been provided. The marginal portions of the screen 7 project beyond the frame 1 in a manner to provide bendable flaps 10 overlapping the door frame 2 to which said flaps may be secured in any suitable manner.

Removable throats designated generally by the reference numeral 11 are mounted in the lower portions of the chambers 9, said throats providing one way closures for the entrance openings 8. Each throat 11 comprises substantially V-shaped blocks 12 detachably secured to the vertical sides of the frame 1, as at 13. Mounted on the blocks 12 is a screen 14 which, of course, is bent substantially V-shaped and which has formed, in its apex portion, a plurality of openings 15 (see Figure 6) for the passage of the insects. One of the longitudinal or horizontal edges of the screens 14 is substantially flush with the upper walls of the entrance openings 8 in the screen 7. Molding strips 16 secure the screen 7 on the frame 1.

It is thought that the operation of the device will be readily apparent from a consideration of the foregoing. Insects, attracted by light on the opposite side of the door, alight on the screen 7 and pass through the openings 8. Upon entering the throats 11, the insects, obeying a well known instinct, crawl upwardly through the comparatively small openings 15 and are trapped in the chambers 9. When it is desired to clean or empty the chambers 9 this may be expeditiously accomplished by detaching the throats 11 and removing said throats through the openings 8.

It is believed that the many advantages of an insect trap constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. An insect trap for closures of the type including a frame and a screen mounted on said frame, comprising a frame adapted to be inserted in the first-named frame and engaged with the screen, a marginal flange on the second-named frame engageable with the first-named frame, and a screen mounted on the second-named frame and, in conjunction with the first-named screen, providing a chamber for the reception of insects, the second-named screen having an entrance opening therein, the marginal portions of said second-named screen projecting beyond the second-named frame in overlapping engagement with the first-named frame.

2. An insect trap for closures of the type including a frame and a screen mounted on said frame, comprising a frame adapted to be mounted in the first-named frame and engaged with the screen, spaced cross bars mounted in the second-named frame, a screen mounted on said second-named frame, the first and second-named screens and the cross bars providing trap chambers in the second-named frame for the reception of insects, the second-named screen having openings therein communicating with the chambers, and one way closures for said openings mounted in the lower portions of the chambers, said closures including substantially V-shaped blocks detachably secured to the second-named frame and substantially V-shaped screens mounted on said blocks and having openings in the apex portions thereof.

OTIS B. MOYE.